United States Patent [19]

Laor

[11] Patent Number: 5,177,348

[45] Date of Patent: Jan. 5, 1993

[54] APPARATUS AND METHOD FOR ALIGNING OPTICAL FIBERS WITH AN ARRAY OF RADIATION EMITTING DEVICES

[76] Inventor: Herzel Laor, 3774 Telluride Cir., Boulder, Colo. 80303

[21] Appl. No.: 749,990

[22] Filed: Aug. 26, 1991

[51] Int. Cl.[5] .............................................. G01J 1/20
[52] U.S. Cl. ............................ 250/201.1; 250/227.24; 356/73.1
[58] Field of Search ................. 250/227.24, 201.1; 356/73.1, 399, 400; 385/52, 97

[56] References Cited

U.S. PATENT DOCUMENTS

| | | | |
|---|---|---|---|
| 3,445,666 | 5/1969 | Snaper | 250/211 |
| 3,732,425 | 5/1973 | Ellert et al. | 250/217 S |
| 3,938,895 | 2/1973 | Bridger et al. | 356/152 |
| 4,220,396 | 9/1980 | Antell | 350/96.15 |
| 4,302,071 | 11/1981 | Winzer | 350/96.20 |
| 4,303,302 | 12/1981 | Ramsey et al. | 350/96.20 |
| 4,378,144 | 3/1983 | Duck | 350/96.18 |
| 4,432,599 | 2/1984 | McMahon | 350/96.15 |
| 4,452,506 | 6/1984 | Reeve et al. | 250/227.24 |
| 4,470,662 | 9/1984 | Mumzhiu | 350/96.15 |
| 4,474,423 | 10/1984 | Bisbee et al. | 385/52 |
| 4,512,036 | 4/1985 | Laor | 455/612 |
| 4,677,290 | 6/1987 | Mitch | 250/227 |
| 4,728,169 | 3/1988 | Campbell et al. | 385/52 |
| 4,758,061 | 7/1988 | Horn | 350/96.15 |
| 4,792,206 | 12/1988 | Skuratovsky | 350/96.21 |
| 4,834,484 | 5/1989 | Gorman et al. | 350/96.18 |
| 4,834,485 | 5/1989 | Estes et al. | 350/96.20 |
| 4,886,331 | 12/1989 | Peterson | 350/96.12 |
| 4,896,935 | 1/1989 | Lee | 350/96.20 |
| 4,923,269 | 5/1990 | Healey | 350/96.15 |
| 4,927,221 | 5/1990 | Kiyono | 350/96.14 |
| 4,952,010 | 8/1990 | Healey | 350/3.77 |
| 5,005,934 | 4/1991 | Curtiss | 350/96.15 |
| 5,016,961 | 5/1991 | Aldrich | 350/96.15 |

*Primary Examiner*—David C. Nelms
*Assistant Examiner*—John R. Lee
*Attorney, Agent, or Firm*—Jansson & Shupe, Ltd.

[57] ABSTRACT

The invention is an improvement in an optical fiber alignment apparatus of the type having a pair of optically-opposed fibers, means associated with one of the fibers for generating an alignment signal, means associated with the other fiber for alignment-sensitive detection of the alignment signal, and means responsive to such detection to adjust relative positions of the fibers. In the improvement, the means for generating the alignment signal comprises an array of radiation-emitting devices (REDs). Radiation from the REDs in an array associated with a particular fiber is received in a radiation guide of the other fiber and indivudally measured. The position of the other fiber is adjusted until radiation received from each RED is substantially equal to that received from each other RED in the array. In one arrangement, the radiation guide is part of the signal-carrying fiber. In another arrangement, the radiation guide is part of a separate aligning fiber mounted adjacent to and movable with the signal-carrying fiber.

26 Claims, 6 Drawing Sheets

APPARATUS AND METHOD FOR ALIGNING OPTICAL FIBERS WITH AN ARRAY OF RADIATION EMITTING DEVICES

FIELD OF THE INVENTION

This invention relates generally to optical fiber switching and, more particularly, to an improved apparatus and method for aligning optical fibers to effect signal transmission therebetween.

BACKGROUND OF THE INVENTION

The advent of high-quality optical fibers spurred development and installation of communication systems using such fibers to carry light-beam signals between remote points. Such "signals" include binary-encoded data, human speech and TV signals encoded for transmission by light beams. Telephone systems commonly employ optical fibers.

A requirement of such communications systems is that any one of a group of optical fibers can be connected to any one of another group of such fibers. Fiber optic switches perform such a function.

In fact, such switches do not physically connect such fibers. Rather, the fibers (or, more accurately, the signal-carrying cores exposed at the fiber ends) are brought to a "signal-transferring" relationship to one other so that a light beam carried by one fiber is "picked up" by the other.

Two factors are of particular importance in a fiber optic switch. One is that alignment of fibers must be performed very rapidly. And this is so irrespective of whether only two or a relatively large number of fibers is involved. Users have little tolerance for delay occasioned by a switch which is slow to react. Another is that alignment must be performed very accurately since signal attenuation (or avoidance of it) is very much a function of alignment accuracy.

One known approach to fiber alignment involves the use of four photodiodes arranged contiguously one to another in a "2×2" arrangement. Such diodes produce an electrical output generally proportional to the amount of light striking the diode. The arrangement uses two or three fibers in side-by-side relationship. One fiber (the center one in a three-fiber configuration) carries the voice or data signal and one or two emit light for alignment. An aligning beam (or beams) of light impinges on the diodes and when the output signal from each diode is generally equal to that of each other diode, the associated signal-carrying fiber is properly aligned.

A disadvantage of this approach is that it seriously affects lens placement and, as a consequence, has an adverse effect on the overall size of the switch.

Other approaches involving fiber alignment (but not in a fiber optic switch) are shown in various U.S. patents, one of which is U.S. Pat. No. 4,677,290 (Mitch). The Mitch patent describes a method for aligning an optical fiber with a single semi-conductor and for fixing (as by soldering) the fiber position, once aligned. The semi-conductor has an electrical characteristic, e.g., voltage, which varies with the intensity of light impinging on it. Light is introduced into the fiber and thence to the semi-conductor and the fiber is moved until the observed electrical characteristic indicates that the desired degree of coupling has been obtained.

The apparatus and method described in U.S. Pat. No. 3,938,895 (Bridger et al.) involves introducing light into one optical fiber which is held stationary. A second fiber is moved until the light coupled into it from the first fiber, as measured by a photodetector, is maximized. The second fiber is then known to be axially aligned with the first fiber.

U.S Pat. No. 4,432,599 (McMahon) shows a fiber optic differential sensor used to determine the displacement of the axis of a light-emitting movable fiber from a "home" or neutral position. The stationary sensing fiber bundle may include two, three or four separate fibers, each of which is connected to a detector and comparator circuit. The movable fiber is known to be in its neutral position when the light received by each of the fibers in the bundle is equal to that received by each of the others. Displacement is measured by detecting imbalances in the received light.

The apparatus shown in U.S. Pat. No. 4,758,061 (Horn) is used for aligning and then joining the ends of two "light waveguides," e.g., fiber optic cables. One waveguide is held stationary and the other is movable in three axes of motion. Light is injected into the stationary waveguide and the movable waveguide is positioned in the "x" and/or "y" directions until the magnitude of injected light received by it is maximized. The waveguides are then known to be in axial alignment. After being so aligned, the movable waveguide is brought toward the stationary waveguide (in the "z" direction) until the ends of the waveguides abut.

The apparatus shown in U.S. Pat. No. 4,792,206 (Skuratovsky) is similar in operation to that shown in the Bridger et al. patent. That is, light is coupled into a fiber optic cable which is held stationary. The end of a movable cable receives light from the stationary cable and is known to be aligned with the stationary cable when the amount of coupled light is at a maximum. Cable movement is by a dual cantilever piezoelectric beam.

OBJECTS OF THE INVENTION

It is an object of the invention to overcome some of the problems and shortcomings of the prior art.

Another object of the invention is to provide an improved apparatus and method for aligning optical fibers in a fiber optic switch.

Still another object of the invention is to provide an improved apparatus and method for aligning optical fibers in a fiber optic switch of reduced physical size.

Another object of the invention is to provide an improved apparatus and method for aligning optical fibers which are movable with respect to one another. How these and other objects are accomplished will become more apparent from the following description of the invention taken in conjunction with the drawing.

SUMMARY OF THE INVENTION

The unique features of the invention will be best appreciated by first understanding a few basic principles of fiber optic switches since the invention has great utility in such switches. Fiber optic switches use optical fibers instead of wires (like telephone wires) to carry signals. Such signals are not electrical voltages and currents but, rather, are "encoded" optical beams used for communication. The term "communication" means to transfer such signals (usually of the video, voice or data type) from one place to another.

A typical fiber optic switch uses two groups of optical fibers to carry and switch many different signals. A fiber from a group is "connected" to a fiber of the other group by aligning the ends of the fibers (and specifically, the signal-carrying fiber cores) so that optical beams can pass between the fibers. As used herein, "align" and like terms means to position physically or optically by, e.g., using one or more lens. And expressions such as "aligned fibers" is to be understood to mean alignment of the signal-carrying cores of such fibers.

Fiber optic switches are often referred to by nomenclature which identifies the number of fibers in each group. For example, a "2×2" switch has two fibers in each group. And by performing switching functions, any one of the fibers in each group can be "connected to" (aligned with) any one of the fibers in the other group.

Precise alignment of fiber ends is difficult but critical for efficient transfer of an optical beam signal from the end of one fiber (the "transmitting fiber" for purposes of this explanation) to the end of the receiving fiber. And of course, either fiber of an aligned pair may function as a transmitting fiber or a receiving fiber. That is, a signal can pass in either direction through the aligned fibers.

It is apparent from the foregoing that proper operation of the alignment apparatus used in a fiber optic switch is very important. The invention is used in an optical fiber alignment apparatus of the type having first and second optically-opposed fibers. As used herein, "optically-opposed" means positioned to generally face one another, either directly or by use of reflective mirrors. As used with respect to fibers, such term means that the ends of the fibers generally face one another.

The alignment apparatus also has means associated with one of the fibers for generating an alignment signal and means associated with the other fiber for alignment-sensitive detection of such signal. Means responsive to such detection adjusts the relative positions of the fibers to align them for signal transfer.

In the inventive improvement, the means for generating the alignment signal comprises an array of radiation-emitting devices (REDs). Such devices, which are mounted in a spaced relationship to one another, may be embodied as conventional light-emitting diodes, infrared-emitting diodes, laser diodes or other types of devices emitting detectable radiation.

In understanding the invention, it will be helpful to first appreciate that each of the two fibers to be aligned has a beam-shaping lens (preferably a collimating lens) and an array of REDs adjacent to and associated with it. The lens shapes the optical beam and for a particular fiber, its lens and and the center of its RED array are arranged in known positions with respect to one another. It will also be helpful to understand that each fiber "lines up" (in ways described below) on the RED array associated with the other fiber so that each fiber is aligned with its "target," the lens associated with the other fiber. Depending upon the embodiment of the invention, the array center may be in registry with the target or it may be offset from it.

The apparatus also includes radiation-responsive means having a radiation guide, a detector and a microprocessor-based, closed loop ("feedback type") servo control for each fiber. Radiation from each RED in an array enters the radiation guide, the intensity of radiation from each RED is detected, i.e., measured, and a signal representing such intensity is generated. The fiber position—and therefore the direction of an emitted optical beam—is adjusted by the control until radiation received from each RED is substantially equal to that received from each other RED. The fiber and the beam are thereby aligned with the target.

It is preferred that the intensity of radiation from each RED be separately detected. One way to do so is to pulse each RED in an array in sequence and such "pulsing" may be steady state or at some common (or even different) modulation frequency. Another way to do so is to pulse those REDs in an array substantially simultaneously but at a different modulation frequency. Yet another way is to continuously drive such REDs at a different modulation frequency.

It is noted above that the center of an RED array may be in registry with the target or it may be offset from the target. Whether in registry or offset depends upon the arrangement of the radiation guide as explained below.

In one arrangement, the radiation guide is concentric with and a part of the signal-carrying fiber. In one preferred embodiment, the fiber has a core and a relatively thin cladding covered by a fiber-protecting plastic coating. The radiation guide, which has a wall thickness greater than that of the cladding, is between the core and the cladding. The guide has a refractive index between that of the core and that of the cladding. In another preferred embodiment, the fiber has a core and a cladding, the latter covered by a plastic coating having a refractive index lower than that of the cladding. RED-emitted radiation is retained in the cladding which functions as a radiation guide. For either embodiment of this arrangement, the array center is in registry with the target.

In another arrangement, the apparatus includes a separate aligning fiber mounted to move with the signal-carrying fiber. A convenient arrangement is to mount the aligning fiber and the signal-carrying fiber side-by-side in a common holder. In such arrangement, the radiation guide is part of the aligning fiber. More specifically, the aligning fiber has a core which functions as a radiation guide, a cladding and a protective plastic coating having a refractive index lower than that of the cladding. In such arrangement, the array center is offset from the target. Further details of the manner in which each arrangement and the various embodiments are used to provide and extract RED-emitted radiation are set forth in the detailed description.

An improved method for aligning an optical fiber core with a target includes the steps of pulsing an array of REDs by applying an electrical potential to each RED. Radiation emitted by the REDs is received in a radiation guide and, as necessary, the position of the core and the radiation guide are adjusted. Position adjustment is until radiation received from each RED is substantially equal to that received from each other RED. The core is thereby aligned with the target. The REDs may be pulsed sequentially or simultaneously. In the latter instance, it is preferred to pulse each RED with a different modulation frequency so that the received radiation can be identified to a particular RED.

A characteristic of REDs is that their performance tends to degrade over time. That is, for a given value of driving voltage or current, the intensity of the emitted radiation diminishes. And such REDs do not necessarily degrade at the same rate one to another. Therefore, a highly preferred apparatus includes calibration means for periodically measuring and, if necessary, adjusting the radiation output of each RED. Adjustment (of the driving voltage or current) is so that the output of each RED is substantially equal to that of each other RED in a particular array. In a fiber optic switch, one approach is to periodically suspend switch operation for RED calibration. With microprocessor-based equipment, the time required for calibration is very short and suspended operation and calibration can be automatically performed every 6-12 months, for example.

For simplicity and ease of understanding some of the features of the invention, the foregoing description involves only a pair of optically-opposed signal-carrying fibers, one in each "group." An explanation of other features, including how the REDs are arranged on apertured panels, is set forth below.

In a practical fiber optic switch, there are several (perhaps 10-15 or more) signal-carrying fibers in each group. The following description is based upon such a switch and may seem complex in the absence of related references to the drawing. A careful reading of the detailed description will result in a full understanding of the invention.

A highly preferred embodiment of the invention includes a pair of generally-flat panels in optically-opposed relationship. Each panel has a front surface "facing" toward the other panel and a back surface. Each panel includes a matrix of apertures, preferably round in shape, arranged in rows and columns and spaced equidistant from one another. Each panel also includes a matrix of REDs formed of plural RED arrays. The REDs forming the matrix are likewise in columns and rows. Those REDs (preferably four in number) forming a particular array are regularly spaced around an aperture, e.g., at 90° from one another. The aperture matrix and the RED matrix each have a matrix "center." In rectangular matrices, the matrix center will be at the intersection of the two lines drawn between diagonally-opposite corners of the matrix.

A group of optical fibers is positioned behind each panel adjacent to its back surface. Each fiber is mounted to nominally "point through" a particular aperture toward the other panel. In the arrangement where the radiation guide is the cladding or is between the core and the cladding of the signal-carrying optical fiber, the aperture matrix and the RED matrix are in general registry with one another. This is so since the radiation guide is concentric with the signal-carrying fiber core. In the arrangement having a separate aligning fiber, the matrix centers are offset from one another since the radiation guide is offset from the signal-carrying fiber core.

When performing a switching function, the apparatus controller is "instructed" to "connect" (by fiber alignment) a fiber in one group with a fiber in the other. Positioning movement of each fiber is by the servo control and a "motor" such as a two-axis piezoelectric bender. Coarse, initial movement of each of the two fibers is by applying predetermined voltages to the benders so each fiber is approximately aligned with the other. In so doing, the radiation guide for a particular fiber (positioned behind a panel) is also approximately aligned with (or is at least closer to being aligned with) a particular RED array mounted on the opposed panel. However, such coarse initial movement rarely results in optimally-aligned fibers. In fact, a fiber and its radiation guide may be well out of alignment, perhaps by the width of an aperture or an RED array. Therefore, it is preferred that the apparatus include provisions for identifying the actual position of a fiber and its radiation guide anywhere on the array matrix so that the fiber can be brought to precise alignment with the other.

In a highly preferred approach, the REDs in each row are pulsed simultaneously, the REDs in each column are pulsed simultaneously and, in either order, rows of REDs are pulsed sequentially and columns of REDs are pulsed sequentially. Since the "protocol" for RED and row and column pulsing is predetermined and coordinated with detectors, the positions of all fibers can be quickly determined and corrective action taken by the controller. This approach helps provide a very fast-acting switch.

In another approach, the REDs in the matrix are pulsed sequentially. Since the sequence is predetermined and since the application of an electrical pulse to an RED is coordinated with the detectors, detection of radiation in a radiation guide indicates fiber position. Corrective adjustment follows. However, sequential pulsing of individual REDs is more time-consuming and tends to delay switch operation.

Further aspects of the invention are set forth in the following detailed description.

DETAILED DESCRIPTION OF PREFERRED EMBODIMENTS

Figure 1:
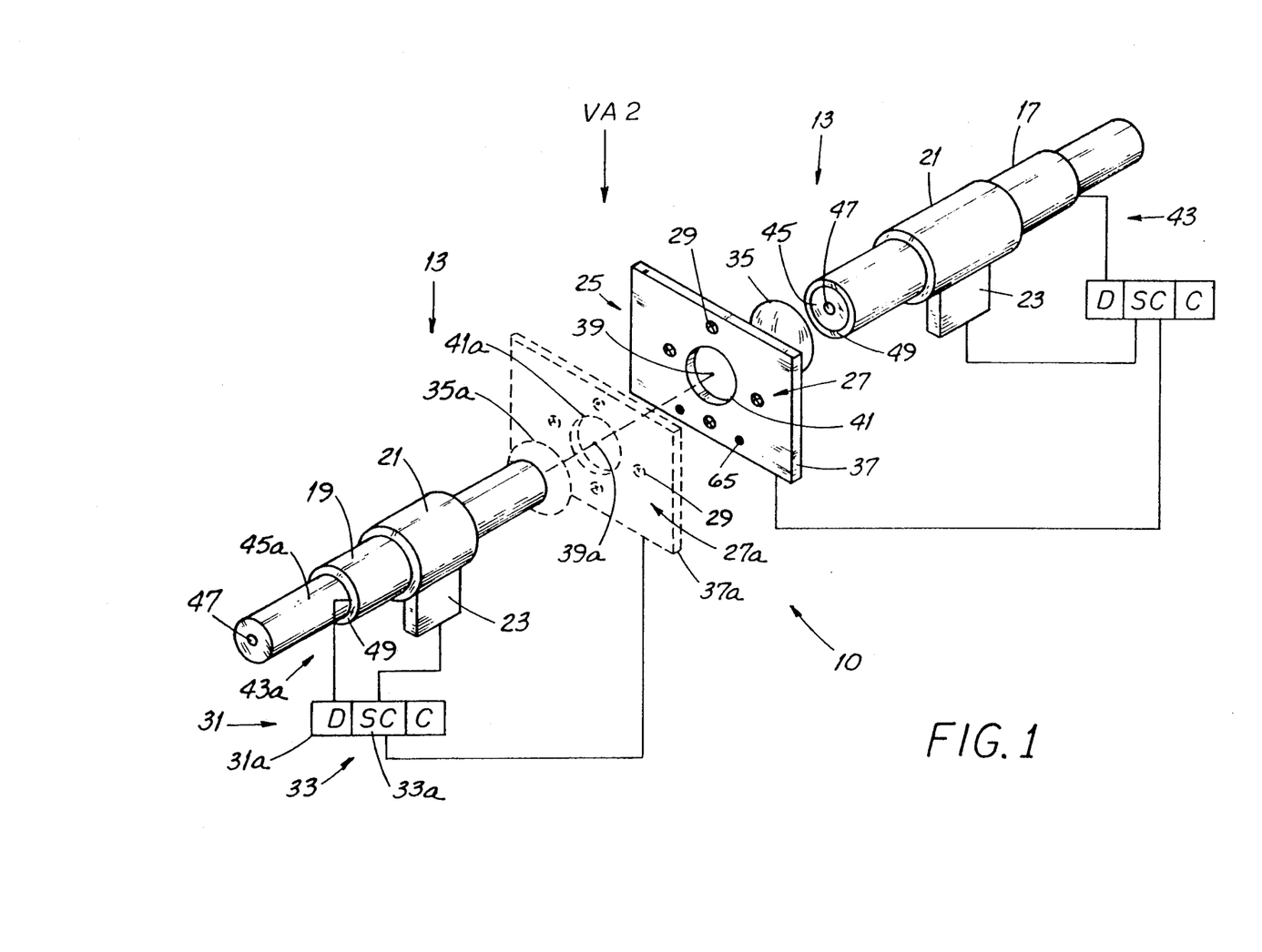
FIG. 1 is a simplified representative perspective view, greatly enlarged and with parts shown in dashed outline and other parts broken away, of one embodiment of the improved apparatus shown in conjunction with a pair of optical fibers to be aligned.
Figure 3:
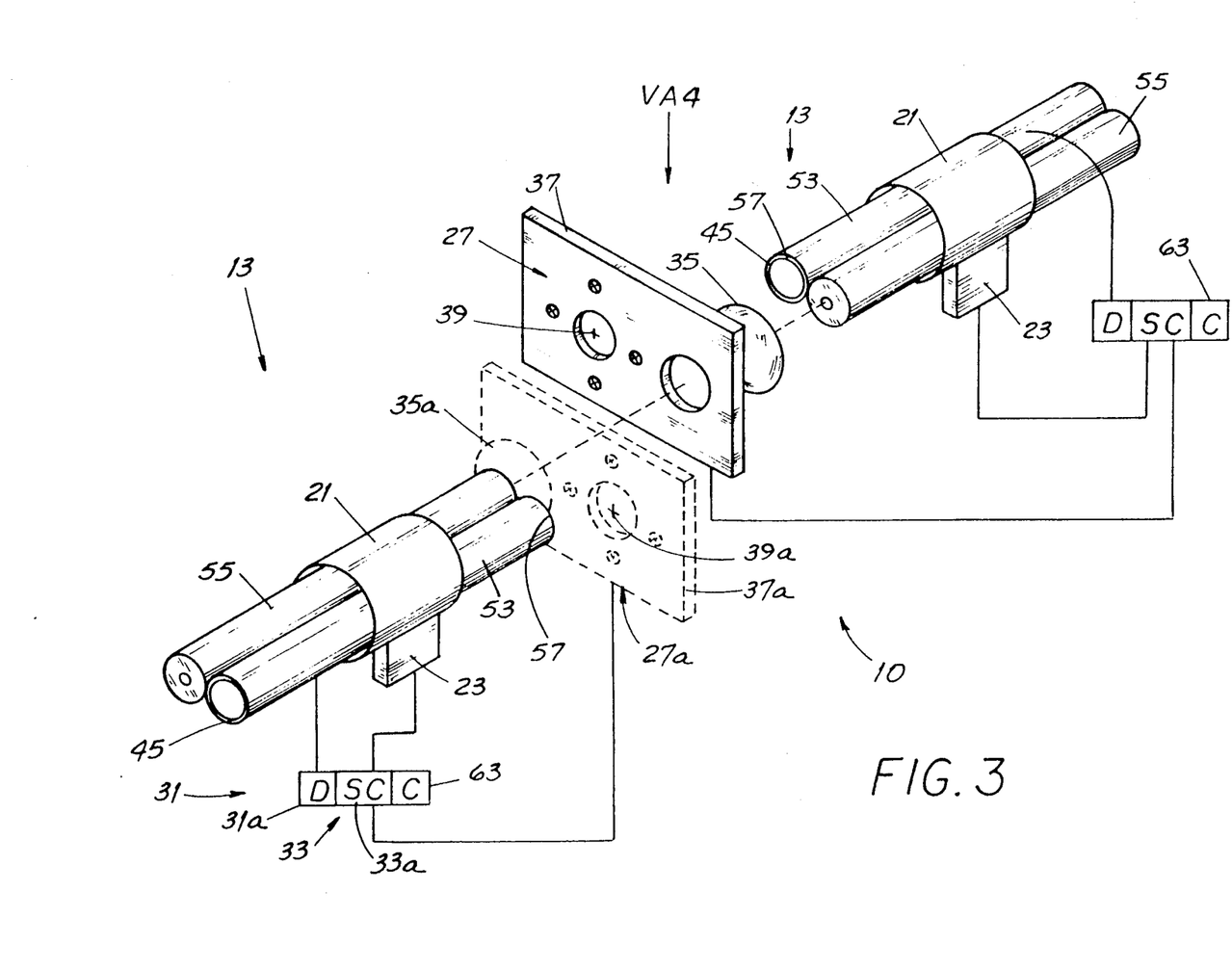
FIG. 3 is a simplified representative perspective view, greatly enlarged and with parts shown in dashed outline and other parts broken away, of another embodiment of the improved apparatus shown in conjunction with a pair of optical fibers to be aligned.
Figure 9:
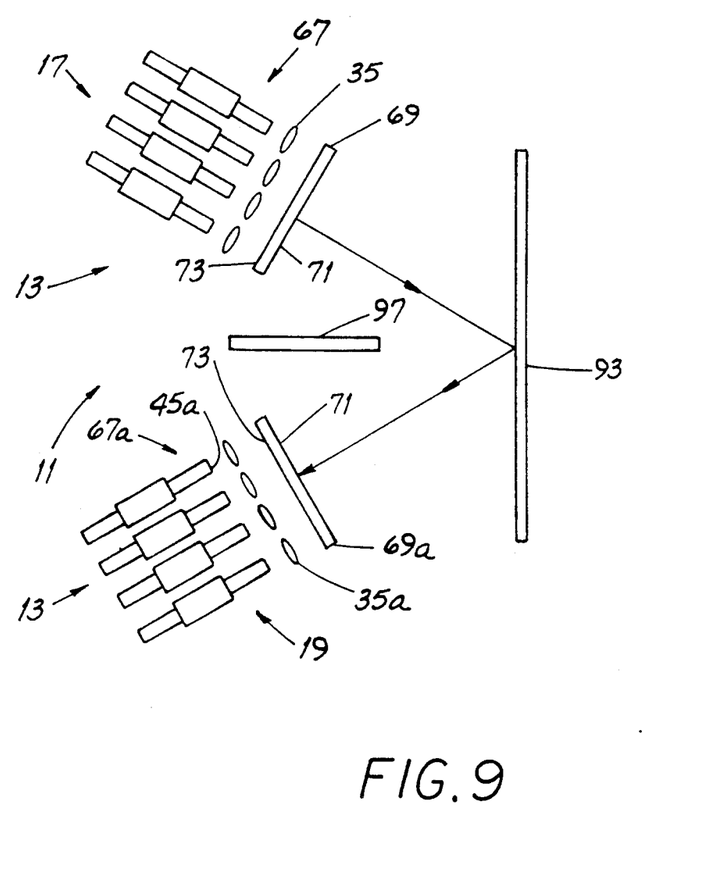
FIG. 9 is a simplified side elevation view of a portion of a fiber optic switch which uses one type of folded optical path.

Referring to FIGS. 1 and 9 (and especially to FIG. 1), the invention will be described first in connection with a simplified arrangement which, when considered alone, is not suitable as a fiber optic switch. However, an understanding of such simplified arrangement will greatly aid understanding of a multi-fiber switch 11 using the invention. Considering FIGS. 1, 3, and 9, it will also be helpful to appreciate that a fiber optic switch 11 may be considered to have two portions or subsets 13 arranged in a mirror-image relationship. These subsets 13 cooperate with one another in the manner described below to effect switching.

In general, the optical fiber apparatus 10 of FIG. 1 includes first and second optically-opposed fibers 17 and 19, respectively. Each fiber 17, 19 is mounted in a holder 21 connected to a positioning "motor" such as a piezoelectric bender 23. When appropriate voltages are applied to the bender 23, it positions a fiber 17, 19 in either or both of two axes of movement, i.e., left/right and up/down as viewed in FIG. 1.

Means 25 associated with one of the fibers, fiber 17 for example, comprises an array 27 of radiation-emitting devices 29 (REDs) for generating an alignment signal. The alignment signal from the REDs 29 is received in and propagates through a portion of the other fiber 19. Means 31 associated with the fiber 19 includes a detector 31a for alignment-sensitive detection of such signal. Means 33 responsive to such detection, such as a microprocessor-based servo controller 33a, adjusts the position of the fiber 19 to align it for signal transfer. Such REDs 29, which are mounted in a spaced relationship to one another, may be conventional light-emitting diodes, infrared-emitting diodes, laser diodes or another type of device emitting detectable radiation. Although the foregoing paragraph describes alignment of only fiber 19, it should be understood that both fibers 17, 19 are simultaneously positioned for alignment with one another.

Each of the two fibers 17, 19 to be aligned has a beam-shaping lens 35, 35a, respectively, (preferably a collimating lens) and an array 27, 27a, respectively, of REDs 29 adjacent to and associated with it. The lens 35, 35a, positioned between a fiber 17, 19 and a panel 37, 37a, shapes the optical beam and facilitates beam alignment with a "target" i.e., the lens 35a, 35 associated with the other fiber 19, 17. For a particular fiber 17, 19, its lens 35, 35a and the center 39, 39a of its RED array 27a, 27 are arranged in known positions with respect to one another. Each fiber 17, 19 "lines up" (in ways described below) on the RED array 27a, 27 associated with the other fiber 19, 17 so that each fiber 17, 19 is aligned with its target. When both fibers 17,19 are in alignment, the communication signal propagating in the core 47 of one of them emerges from the core 47 at the fiber end 57, travels through air and two lens 35, 35a and enters the core 47 of the other fiber. Depending upon the embodiment of the invention, the array center 39, 39a may be in registry with the target lens 35, 35a or it may be offset from it.

To give an idea of scale, each lens 35, 35a and the aperture 41, 41a in each panel 37, 37a is about 6 millimeters in diameter while each fiber 17, 19 is about 125 microns in diameter. That is, the diameter of a fiber 17, 19 is very much less than the diameter of a lens 35, 35a or aperture 41, 41a.

The apparatus 10 also includes radiation-responsive means 43, 43a each having a radiation guide 45 as well as the detector 31a and the microprocessor-based, closed loop ("feedback type") servo control 33a for each fiber 17, 19. Radiation from each RED 29 in an array 27, 27a enters the radiation guide 45, 45a, the intensity of radiation from each RED is detected, i.e., measured, and a signal representing such intensity is generated. The fiber position—and therefore the direction of an emitted optical beam—is adjusted by the control 33a until radiation received from each RED 29 is substantially equal to that received from each other RED 29. The fiber 17, 19 and the beam are thereby aligned with the target 35, 35a.

It is preferred that the intensity of radiation from each RED 29 be separately detected. One way to do so is to pulse each RED 29 in an array 27, 27a in sequence and such "pulsing" may be steady state or at some common (or even different) modulation frequency. Another way to do so is to pulse those REDs 29 in an array 27, 27a substantially simultaneously but at a different modulation frequency. Yet another way is to continuously drive such REDs 29 at a different modulation frequency.

It is noted above that the center of an RED array 27, 27a may be in registry with the target 35, 35a or it may be offset from the target 35, 35a. Whether in registry or offset depends upon the arrangement of the radiation guide 45, 45a as explained below.

Figure 5A:
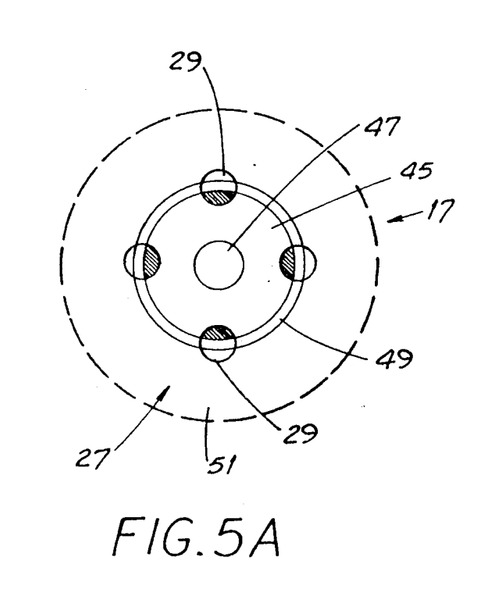
FIG. 5A is a depiction, greatly enlarged, of one embodiment of a fiber shown in a projected "overlap" relationship with an array of REDs. Such depiction relates to the apparatus of FIG. 1.

In the arrangement shown in FIGS. 1 and 5A, the radiation guide 45 is concentric with and a part of the signal-carrying fiber 17. The fiber 17 has a core 47 and a cladding 49 and the radiation guide 45 is between the core 47 and the cladding 49. The fiber 17 is covered by a protective plastic coating 51. The guide 45 has a refractive index between that of the core 47 and that of the cladding 49. As exemplary dimensions, the core 47 has a diameter of about 62.5 microns, the guide 45 has an outside diameter of about 115 microns, the cladding 49 has an outside diameter of about 125 microns and the coating 51 has an outside diameter of about 250 microns. The fiber 17 of FIG. 5A may be used in the arrangement of FIG. 1.

Figure 5B:
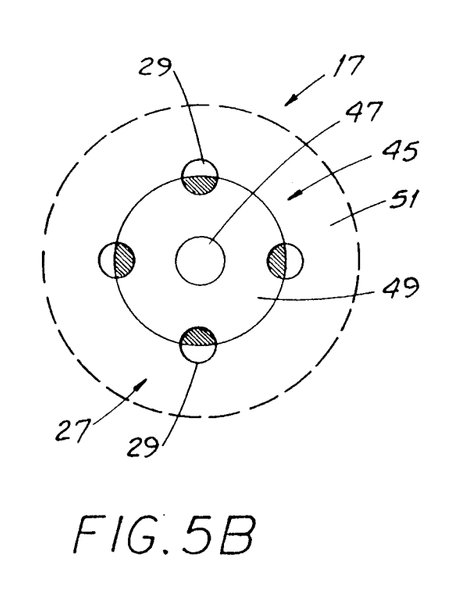
FIG. 5B is a depiction, greatly enlarged, of another embodiment of a fiber shown in a projected "overlap" relationship with an array of REDs. Such depiction also relates to the apparatus of FIG. 1.

FIG. 5B shows another type of fiber 17 having a core 47, a concentric cladding 49 (of about 125 microns in diameter) and a protective plastic coating 51 having a refractive index lower than that of the cladding 49. RED-emitted radiation is retained in the cladding 49 which functions as a radiation guide 45. The fiber 17 of FIG. 5B may alternatively be used in the apparatus of FIG. 1.

Figure 2:
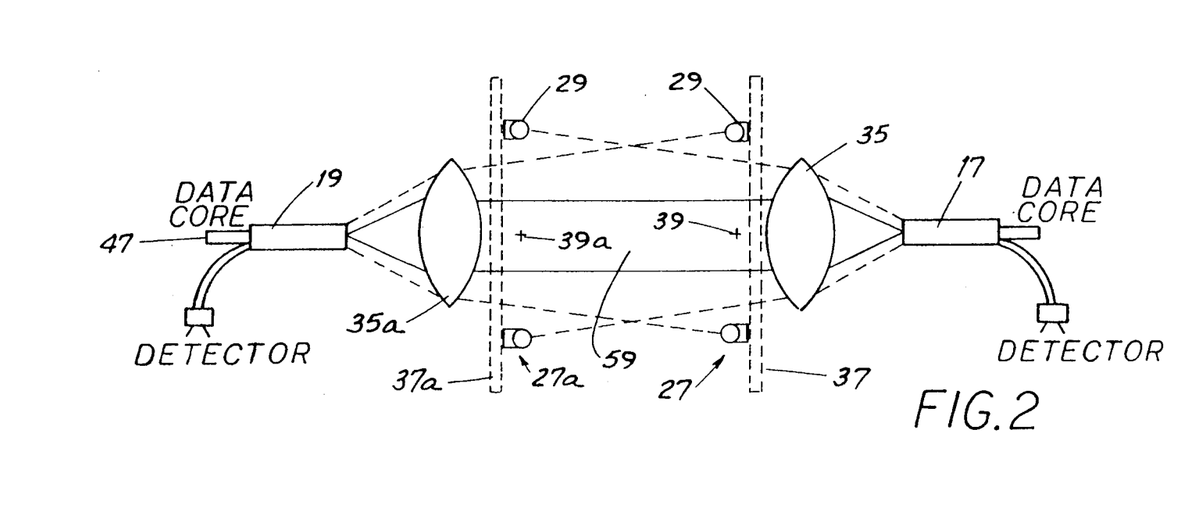
FIG. 2 is a simplified top plan view, with parts shown in dashed outline, of the apparatus of FIG. 1 taken along the viewing axis VA2 thereof.

Referring additionally to FIG. 2, for either embodiment of this arrangement, the array center 39, 39a is in registry with the target lens 35, 35a since the radiation guides 45, 45a are concentric with the cores 47 of their respective fibers 17 and 19. Radiation from each RED 29 in the array 27 passes through the aperture 41a and the lens 35a and enters the radiation guide 45a of the fiber 19. Similarly, radiation from the REDs 29 in the array 27a passes through the aperture 41 and the lens 35 and enters the radiation guide 45 of the fiber In another arrangement shown in FIG. 3, the apparatus 10 includes a separate aligning fiber 53 mounted to move with the signal-carrying fiber 55. A convenient arrangement is to mount the aligning fiber 53 and the signal-carrying fiber 55 side-by-side in a common holder 21 which, like that of FIG. 1, is moved in two axes by a bender 23. In such arrangement, the radiation guide 45 is part of the aligning fiber 53 and the array center 39 is offset from the target lens 35, 35a. More specifically and referring additionally to FIG. 6, the aligning fiber 53 has a core 47 which is used as a radiation guide. The core 47 is surrounded by a concentric cladding 49 which, in turn, is surrounded by a protective plastic coating 51. As exemplary dimensions, the diameters of the core 47, the cladding 49 and the coating 51 are about 115, 125 and 250 microns, respectively.

Figure 4:
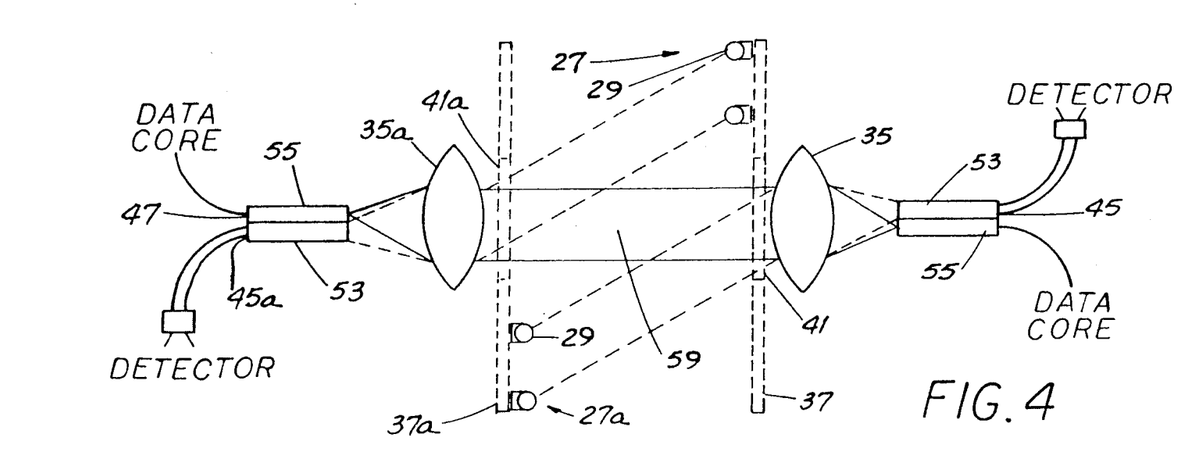
FIG. 4 is a simplified top plan view, with parts shown in dashed outline, of the apparatus of FIG. 3 taken along the viewing axis VA4 thereof.

Referring additionally to FIG. 4, radiation from the REDs 29 in the array 27 passes through the aperture 41a and the lens 35a and enters the radiation guide 45a of the fiber 53. Similarly, radiation from the REDs 29 in the array 27a passes through the aperture 41 and the lens 35 and enters the radiation guide 45 of the fiber 53. Merely to give an idea of scale, each signal-carrying optical beam 59 shown in FIGS. 2 and 4 is about 5 millimeters in diameter between the lens 35, 35a and focuses to a spot about 50-60 microns in diameter where it impinges on a fiber core 47. Lens 35, 35a have a focal length of about 10 mm. and the panels 37, 37a are about 900 mm. apart, either measured along a straight line or, preferably, measured along a folded optical path 91 as described below.

Figure 6:
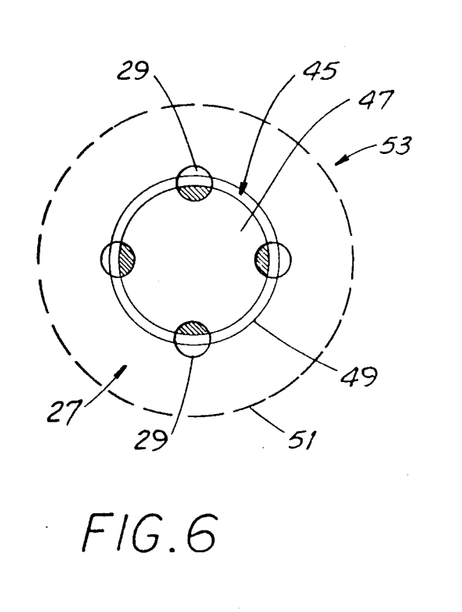
FIG. 6 is a depiction, greatly enlarged, of yet another embodiment of a fiber shown in a projected "overlap" relationship with an array of REDs. Such depiction relates to the apparatus of FIG. 3.

Referring to FIGS. 5A, 5B and 6, optimum switch performance results when the guides 45 receive ample radiation from the REDs 29. Such radiation provides a strong "signal" for detection by the detector 31a. Accordingly, each annular radiation guide 45, 45a should, when projected to the REDs 29 in an array 27, overlap about one-half of the area of the image of such REDs 29. This principle is shown in FIGS. 5A and 5B for the arrangement of FIGS. 1 and 2 and in FIG. 6 for the arrangement of FIGS. 3 and 4.

FIGS. 2 and 4 are marked to identify the data core 47. It should be appreciated that such core 47 may carry data, voice, video or other types of optical signals and is not limited to data alone.

From the foregoing, it will be seen that an improved method for aligning an optical fiber core 47 with a target lens 35, 35a includes the steps of pulsing an array 27 of REDs 29 by applying an electrical potential to each RED 29. Radiation emitted by the REDs 29 is received in a radiation guide 45, 45a and, as necessary, the position of the core 47 and the radiation guide 45, 45a are adjusted. Position adjustment is until radiation received from each RED 29 is substantially equal to that received from each other RED 29 in an array 27, 27a. The core 47 is thereby aligned with the target 35, 35a. The REDs 29 may be pulsed sequentially or simultaneously as described above. In the latter instance, it is preferred to pulse (or continuously drive) each RED 29 with a different modulation frequency so that the received radiation can be identified to a particular RED 29.

For easier understanding, the above description is with respect to one core and one array of REDs. It should be appreciated that, in practice, two cores are simultaneously aligned with their targets so that the communication signal propagates from fiber to fiber as described above.

A characteristic of REDs 29 is that their performance tends to degrade over time. That is, for a given value of driving voltage or current, the intensity of the emitted radiation diminishes. And such REDs 29 do not necessarily provide the same intensity when new nor do they degrade at the same rate one to another. Therefore, a highly preferred apparatus 10 includes calibration means 63 for periodically measuring and, if necessary, adjusting the radiation output of each RED 29. Adjustment (of the driving voltage or current) is so that the output of each RED 29 is substantially equal to that of each other RED 29 in a particular array 27, 27a.

In a fiber optic switch 11, one approach is to periodically suspend switch operation for RED calibration. With microprocessor-based equipment, the time required for calibration is very short and suspended operation and calibration can be automatically performed every 6-12 months, for example. When calibrating, each RED 29 on a panel 37, 37a is pulsed in sequence and its output measured by sensor REDs 65 on the companion panel 37a, 37. The sensor REDs 65 are used only for calibration, not for fiber alignment.

For simplicity and ease of understanding some of the features of the invention, the foregoing description involves only a pair of optically-opposed signal-carrying fibers 17, 19, one in each "group." An explanation of other features, including how the REDs 29 are arranged on apertured panels, is set forth below.

Figure 7:
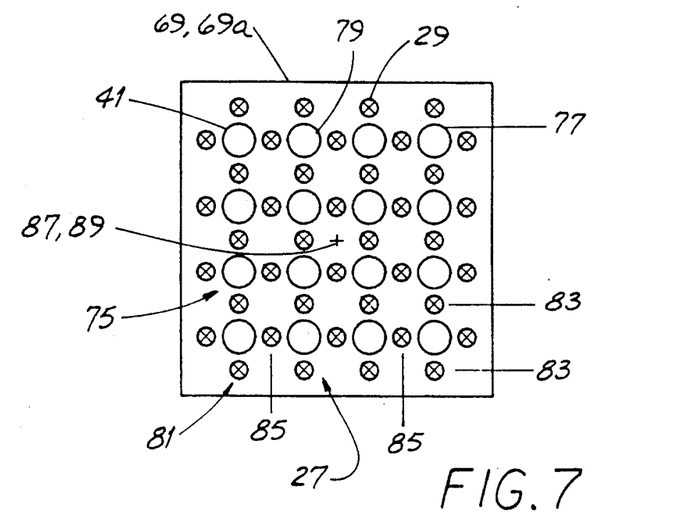
FIG. 7 is a front elevation view of a panel used with that embodiment of the apparatus shown in FIGS. 1A and 2.
Figure 8:
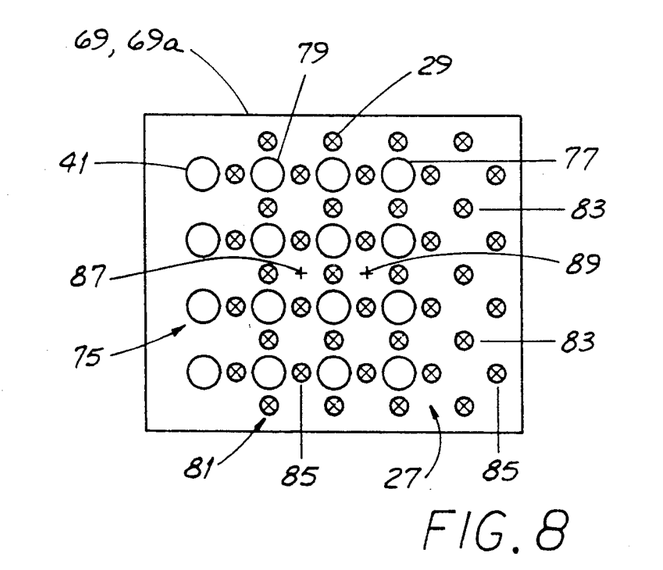
FIG. 8 is a front elevation view of another panel used with that embodiment of the apparatus shown in FIGS. 3 and 4.

Referring now to FIGS. 7-9, a practical fiber optic switch 11 has several (perhaps 10-15 or more) signal-carrying fibers 17, 19 in each group 67, 67a. When considering the following explanation, it should be recognized that any fiber 17 in group 67 can be "connected" to any fiber 19 in group 67a. That is, fiber interconnection is not limited to a single pair of fibers, one in each group. For example, in a switch 11 having sixteen fibers in each group, there are well in excess of 200 different connection possibilities.

The switch 11 includes a pair of generally-flat panels 69, 69a in optically-opposed relationship. The panels 69, 69a shown in FIGS. 7-9 (and particularly in FIGS. 7 and 8) are generally analogous to the panels 37, 37a and shown in FIGS. 1 and 3. Each panel 69, 69a has a front surface 71 "facing" toward the other panel 69, 69a and a back surface 73. Each panel 69, 69a includes a matrix 75 of apertures 41. Such apertures 41 are preferably round in shape, arranged in rows 77 and columns 79 and spaced equidistant from one another. Each panel 69, 69a also includes a matrix 81 of REDs 29 formed of plural RED arrays 27. The REDs 29 forming the matrix 81 are likewise in rows 83 and in columns 85. When considering FIGS. 7 and 8, it should be understood that in a highly preferred embodiment, any particular RED is part of a row 83 or part of a column 85 but not both. However, arrangements in which a particular RED is part of both a row and a column are possible.

The aperture matrix 75 and the RED matrix 81 each have a matrix "center" 87, 89, respectively. In rectangular matrices, the matrix center will be at the intersection of two lines drawn between diagonally-opposite corners of the matrix.

It is to be noted that in the panel 69, 69a of FIG. 7, the matrix centers 87, 89 are in general registry with one another. Such panel 69, 69a is used with the arrangement shown in FIGS. 1 and 2. On the other hand, the matrix centers 87, 89 are offset from one another in the panel 69, 69a of FIG. 8. Such panel 69, 69a is used with the arrangement shown in FIGS. 3 and 4. Each panel 69, 69a is configured in a "4×4" matrix.

Those REDs 29 (preferably four in number) forming a particular array 27 are regularly spaced around an aperture 41, e.g., at 90° from one another. To analogize RED location to the face of a clock, one RED 29 would be located at 12, 3, 6 and 9 o'clock with respect to an aperture 41. The REDs 29 in an array 27 are also mounted equidistant from the center of the aperture 41 with which they are associated. The arrangement of the apertures 41 and REDs 29 is cooperatively selected so that the RED 29 at 3 o'clock for a particular aperture 41 is the RED 29 at 9 o'clock for that aperture 41 immediately adjacent to the right. Similarly, the RED 29 at 6 o'clock for a particular aperture 41 is the RED 29 at 12 o'clock for that aperture 41 immediately below.

Referring further to FIG. 9, the general construction of a preferred optical switch 11 will now be described and followed by further detailed description of the invention. In the illustrated switch 11, a group 67, 67a of optical fibers 17, 19 is positioned behind each panel 69, 69a adjacent to its back surface 73. Lens 35, 35a are mounted between the fibers 17, 19 and the panels 69, 69a. The switch 11 uses what is known as a "folded optical path" 91 which helps reduce its overall physical size.

In the illustrated switch 11, an optical beam from a fiber 17 in, say, the group 67 is directed to a frontal mirror 93. The optical beam is reflected from such mirror 93 to a fiber 19 in the group 67a. Radiation from REDs 29 on surface 71 is similarly reflected to a radiation guide 45a in the group 67a. A light baffle 97 is used to prevent "short circuiting" of light travelling between panels 69, 69a. Such baffle 97 is especially important when calibrating or "normalizing" the output of the REDs 29. There are other types of folded optical paths and the described arrangement of a switch 11 with a folded optical path 91 is generally known.

When performing a switching function, the apparatus controller 33a is "instructed" to "connect" (by fiber alignment) a fiber 17 in one group 67 with a fiber 19 in the other group 67a. Positioning movement of each fiber 17, 19 is by the servo control 33a and a "motor" such as a two-axis piezoelectric bender 23. Coarse, initial movement of each of the two fibers 17, 19 is by applying predetermined voltages to the benders 23 so each fiber 17, 19 is approximately aligned with the other. In so doing, the radiation guide 45, 45a for a particular fiber 17, 19 (positioned behind a panel 69, 69a) is also approximately aligned with (or is at least closer to being aligned with) a particular RED array 27, 27a mounted on the opposed panel 69, 69a. However, such coarse initial movement rarely results in optimally-aligned fibers. In fact, a fiber 17, 19 and its radiation guide 45, 45a may be well out of alignment, perhaps by the width of an aperture 41 or an RED array 27. Therefore, it is preferred that the apparatus include provisions for identifying the actual position of a fiber 17, 19 and its radiation guide 45, 45a anywhere on the RED matrix 81 so that the fiber 17, 19 can be brought to precise alignment with the other.

In a highly preferred approach, the REDs 29 in each row 83 are pulsed simultaneously, the REDs 29 in each column 85 are pulsed simultaneously and, in either order, rows 83 of REDs 29 are pulsed sequentially and columns 85 of REDs 29 are pulsed sequentially. Pulsing rows 83 of REDs 29 provides information as to the vertical location of a fiber 17 while pulsing columns 85 of REDs 29 provides information as to the horizontal location of a fiber 17.

Since the "protocol" for RED and row and column pulsing is predetermined in the controller 33a and coordinated with detectors 31a, the positions of all fibers 17, 19 can be quickly determined and corrective action taken by the controller 33a as needed. This approach helps provide a very fast-acting switch 11. It should be appreciated that, preferably, each fiber 17, 19 has its own separately-controlled "servo loop" so that all fibers 17, 19 can be quickly positioned simultaneous rather than in some sequence.

In another approach, the REDs 29 in the matrix 81 are pulsed sequentially. Since the sequence is predetermined and since the application of an electrical pulse to an RED 29 is coordinated with the detectors 31a, detection of radiation in a radiation guide 45, 45a indicates fiber position. Corrective adjustment follows. However, sequential pulsing of individual REDs 29 is more time-consuming and tends to delay switch operation.

Referring again to FIGS. 5A, 5B and 6, details regarding the extraction of "alignment light" from a radiation guide 45 are described below. With a fiber 17 of the type shown in FIG. 5A, the plastic coating 51 is removed from the fiber 17 starting at a location about 10 cm. from the fiber end 57. At such location, the cladding 49 is etched to remove it. Light sensors (not shown) are glued to the now-exposed radiation guide 45 using high-refractive-index glue to cause RED-emitted radiation to impinge on such sensors which are connected to a detector 31a.

With a fiber 17 of the type shown in FIG. 5B, the plastic coating 51 is similarly removed from the fiber 17 starting at a location about 10 cm. from the fiber end 57. At such location, light sensors (not shown) are glued to the now-exposed radiation guide 45 in the manner described above.

With an aligning fiber 53 as shown in FIG. 6, such fiber 53 is cleaved (severed squarely) at a location about 10–20 cm. from the fiber end 57. The now-exposed core 47 is butt coupled to a light sensor or to the detector 31a as required.

While the principles of the invention have been shown and described in connection with only a few embodiments, it is to be clearly understood that such embodiments are exemplary and that other embodiments are possible without departing from the spirit of the invention.

I claim:

1. In an optical fiber alignment apparatus of the type having first and second optically-opposed fibers, means associated with the first fiber for generating an alignment signal, radiation-responsive means coupled to the second fiber for adjusting relative positions of the fibers, the improvement wherein the means for generating the alignment signal comprises an array of stationary radiation-emitting devices (REDs) mounted adjacent to the first fiber.

2. The apparatus of claim 1 further including a target, the array of REDs has an array center in a known position with respect to the target and the radiation-responsive means includes a servo control for adjusting the position of one of the fibers until radiation received from each RED is substantially equal to that received from each other RED, the fiber thereby being aligned with the target.

3. The apparatus of claim 2 wherein the REDs are pulsed in sequence for measurement of radiation received from each RED.

4. The apparatus of claim 2 wherein the REDs are pulsed at a modulation frequency which is the same for each RED.

5. The apparatus of claim 2 wherein the REDs are pulsed substantially simultaneously and each RED is pulsed at a different modulation frequency.

6. The apparatus of claim 1 wherein the first fiber carries an optical beam and the apparatus further includes a lens shaping such beam.

7. The apparatus of claim 6 wherein the radiation-responsive means includes a radiation guide for receiving radiation from the REDs and a detector for measuring received radiation and providing a signal representative thereof.

8. The apparatus of claim 7 wherein the second fiber has a core and a cladding, the radiation guide is between the core and the cladding and has a refractive index between that of the core and that of the cladding.

9. The apparatus of claim 7 wherein the second fiber has a cladding covered by a coating having a refractive index lower than that of the cladding to retain RED-emitted radiation in the cladding and wherein the radiation guide is the cladding.

10. The apparatus of claim 8 further including a target and wherein the array center is in registry with the target.

11. The apparatus of claim 9 further including a target and wherein the array center is in registry with the target.

12. The apparatus of claim 7 further including a target and an aligning fiber which is mounted to move with the second fiber, and wherein the radiation guide is part of the aligning fiber and the array center is offset from the target.

13. The apparatus of claim 1 further including calibration means for measuring the radiation output of each RED and adjusting such output to substantially equate the output of each RED to that of each other RED in an array.

14. The apparatus of claim 13 wherein the apparatus is a fiber optic switch, the operation of which is periodically suspended for RED calibration.

15. An improved apparatus for aligning two optical fibers including:
   a pair of optical fibers;
   a separate array of stationary REDs mounted adjacent to each fiber;
   a separate radiation-responsive means coupled to each fiber for adjusting fiber position until radiation received from each RED in an array is substantially equal to that received from each other RED,
whereby the fibers are aligned with one another.

16. The apparatus of claim 15 wherein at least one fiber has a lens associated therewith and emits an optical beam collimated by such lens and wherein the direction of such collimated beam is adjusted by adjustment of fiber position.

17. The apparatus of claim 16 wherein each radiation-responsive means includes a radiation guide for receiving RED-emitted radiation and the apparatus includes a pair of panels in optically-opposed relationship and each panel includes:
   a matrix of apertures;
   a matrix of REDs formed of plural RED arrays,
   whereby the fibers are aligned with one another when radiation received in a radiation guide from each RED in an array is substantially equal to that received from each other RED in that array.

18. The apparatus of claim 17 wherein the aperture matrix and the RED matrix each have a matrix center and the matrix centers are in general registry with one another.

19. The apparatus of claim 17 wherein the aperture matrix and the RED matrix each have a matrix center and the matrix centers are offset from one another.

20. The apparatus of claim 15 further including a panel having plural arrays of REDs defining a matrix and wherein REDs in the matrix are pulsed sequentially when adjusting fiber position.

21. The apparatus of claim 15 further including a panel having plural arrays of REDs defining a matrix and wherein REDs in the matrix are driven continuously and at differing frequencies when adjusting fiber position.

22. The apparatus of claim 15 further including a panel having columns and rows of REDs defining an array matrix, wherein REDs in each row are pulsed simultaneously, wherein REDs in each column are pulsed simultaneously and wherein, in either order:
   rows of REDs are pulsed sequentially;
   columns of REDs are pulsed sequentially,
thereby reducing time required to align the fibers.

23. An improved method for aligning an optical fiber core with a target including the steps of:
   energizing an array of stationary REDs mounted adjacent to the core;
   receiving emitted radiation in a radiation guide;
   adjusting the position of the core and the radiation guide until radiation received from each RED is substantially equal to that received from each other RED,
thereby aligning the core with the target.

24. The method of claim 23 wherein the REDs are energized by pulsing them in sequence.

25. The method of claim 23 wherein the REDs are energized by pulsing them substantially simultaneously.

26. The method of claim 23 wherein the REDs are energized by driving them continuously and at differing frequencies when adjusting fiber position.

* * * * *